United States Patent Office 3,843,557
Patented Oct. 22, 1974

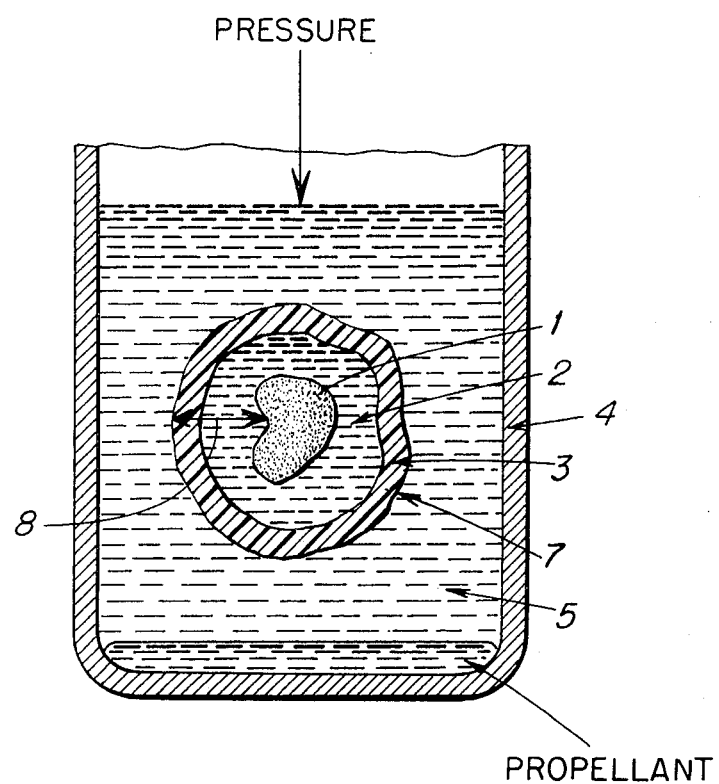

3,843,557
MICROCAPSULES AND METHOD OF MAKING SAME
Gene O. Fanger, Slate Hill, N.Y., James E. Flinn, Columbus, Ohio, Ralph G. Hollingsworth, Ann Arbor, Mich., and Herman Nack, Columbus, Ohio, assignors to The Mennen Company, Inc., Morristown, N.J.
Filed Oct. 5, 1971, Ser. No. 186,699
Int. Cl. B01j 13/02; B44d 1/16
U.S. Cl. 252—316                                                     15 Claims

ABSTRACT OF THE DISCLOSURE

There are disclosed microcapsules resistant to penetration by water and other polar liquids which comprise a solid, water-sensitive core and a wall, said wall comprising a first layer of a hydrocarbon or halogenated hydrocarbon liquid and a second layer of film-forming water-insoluble polymeric organic material insoluble in, and substantially non-swellable by but permeable to hydrocarbon and halogenated hydrocarbon solvents. The first layer may include a carrier material such as a wax or a resin such as a terpolymer of ethylene, vinyl acetate and acrylic or methacrylic acid. The second layer may be a vinyl resin, polyolefin, halogenated polyolefin or chlorinated rubber. The microcapsules are made by encapsulating the solid, water sensitive core with a first layer comprising a waxy or fatty carrier material and a second layer of the above-stated film-forming water-insoluble polmeric organic material, and treating the resulting microcapsules with a non-polar hydrocarbon or halogenated hydrocarbon solvent to dissolve and displace at least a portion of said first layer.

BACKGROUND

In the art of encapsulating solid or liquid materials, a significant feature is the ability of the capsule wall to contain the core material for a satisfactorily extended period of time. Nearly any encapsulating material or encapsulating wall exhibits some degree of porosity either because of defects such as voids and fissures in the wall itself or because of the open molecular structure of the material making up the wall.

Where the encapsulated material consists of relatively large molecules which do not readily penetrate the porous structure of the capsule wall and where the utilization of the capsules does not involve their contact with polar liquids such as water, isolation of the core from the environment outside the capsule walls does not generally constitute a problem. For example, the carbonless paper copy sheets described in U.S. Pat. 2,712,508 to Green, employ capsules that have walls of congealed hydrophilic colloids enveloping oily carrier materials. Since the capsules are not exposed to polar liquids such as water which would penetrate the capsule walls and leach or dilute the core, and since the core itself consists of a liquid unable to penetrate the walls, the "shelf life" or keeping qualities of the capsules and paper are satisfactory.

On the other hand, problems arise when the core material is a polar liquid such as water, or when the projected use of the capsules involves their contact with such liquids, because the capsule wall will not be able to resist liquid penetration for any extended time, and while U.S. Pat. 3,173,878 discloses a dye or color-reactant material in a polar liquid or water carrier encapsulated with an organic polymer in place of the capsules described in the aforementioned Green patent such capsules do not have satisfactory liquid-keeping properties.

It has been proposed to encapsulate solid water soluble reactants with an organic polymer and disperse them in an aqueous solution of a second reactant in an aerosol container. In one application, the capsule walls are designed to rupture upon the decrease in external pressure accompanying release of the capsules from the aerosol container, and the encapsulated reactant reacts with the second reactant exothermically, generating heat. When the ingredients of shaving cream lather are also present in the aerosol container, it is possible, in this manner, to generate hot lather. However, in such applications it is essential that the walls of the capsules be substantially water impermeable to prevent premature reaction between the encapsulated reactant and the external reactant so that the product will have sufficient "shelf life" for practical use.

In general, when a permeable barrier such as an organic film or coating separates an aqueous solution from a material or solution (solid, liquid, or gas) having an affinity for water, then water will permeate the coating at a rate determined by the following general expression:

Rate of permeation $$= \frac{\text{(barrier constant) (area) (driving force)}}{\text{thickness}}$$

That is, the rate of permeation will be higher for thin barriers spread over arge areas, and where the driving force across the barrier is large. Where thin barriers, large areas, and high driving forces cannot be avoided, then the physical and chemical nature of the barrier material itself, represented by the term "barrier constant" in the above expression, becomes critical with respect to reducing the rate of permeation, and for a barrier of given thickness and area, subjected to a given driving force, the rate of permeation of a given substance can be decreased only by changing the nature of the barrier. In the past this has been done by any of several techniques, such as (1) altering the composition or method of forming of the barrier, or (2) post-treating the barrier by use of heat, solvents, or mechanical stressing. However, such methods for improving the intrinsic physiochemical barrier properties of capsule walls have produced only small reductions in permeation rates.

The present invention provides a means of prolonging the useful life of an encapsulated product by providing a barrier or coating in the capsule which effectively prevents mixing or interaction between the encapsulated material and external surroundings. In particular, the improved barrier according to the invention can be used to totally enclose a chemical reactant so that this reactant and a second reactant dissolved or suspended in an external aqueous media can be prevented from coming into contact until such time as reaction is desired.

THE INVENTION

We have discovered that the resistance of organic polymer capsule walls to penetration or permeation by water or like polar liquids may be significantly enhanced by adding to such walls a layer containing a non-polar organic liquid, for example, a low molecular weight halogenated organic compound, such as fluorocarbon.

In capsules made according to our invention, a core material may first be encapsulated with one or more inner layers of a material that is essentially insoluble in water or other polar liquid, but which is substantially soluble in a non-polar, organic liquid. The capsule is further provided with at least one *outer* layer composed of a film forming organic resin which is insoluble in the non-polar liquid. When such capsules are exposed to the non-polar liquid compound, we have found that the liquid penetrates the outer resin layer or layers to replace at least a portion of the inner layer or layers and form a halogenated hydrocarbon containing layer that is essentially polar liquid (water) impermeable. The capsule or capsules then have one or more outer layers of an organic resin plus one or more inner layers characterized by high polar liquid impermeability. The combined effect is a capsule or capsules that exhibit surprising "shelf life" or lasting qualities.

In a further preferred embodiment of the invention, core material is encapsulated with one or more inner layers of a material consisting essentially of a mixture of a carrier and an organic polymer, and an outer layer composed of a film forming organic polymer or resin. The carrier may be a material with intrinsic water impermeability characteristics but soluble in the non-polar liquid and the organic polymer in the inner layers may be the same polymer or resin in the outer layer or wall, but is peferably a polymer or resin capable of being swollen by the non-polar liquid. The capsule or capsules are then contacted with a non-polar liquid, such as fluorocarbon, preferably by being immersed in the liquid for a period of time sufficient to enable the liquid to penetrate the outer polymer layer, and remove and replace a portion of the carrier. The result is a capsule with a polar liquid or water-resistant barrier wall or envelope. The "barrier constant" referred to in the above-recited formulation is surprisingly low so that for any given capsule wall thickness, area of exposed capsule wall surface, or driving force, the rate of permeation will be lower than for prior known encapsulated materials.

As a further and more detailed description of the preferred embodiment of the present invention, reference is made to the drawing which is a schematic view in cross section illustrative of a capsule according to the invention.

Referring to the drawing, a container 4 holds a liquid 5 in which a single capsule 7 is shown in cross section.

It will be understood that the drawing is illustrative only. For example, container 4 may be the bottom of a pressurized aerosol can. Since the pressure release mechanism forms no part of the present invention, it is not shown. However, the fact that the liquid 5 (which may, for example, be water) is under pressure, is appropriately illustrated by arrows and the wording "pressure." The single capsule 7, shown in cross section, is grossly out of proportion since in actual practice such a capsule would likely range in average diameter from 1 micron to 500 microns and many such capsules would be dispersed in the liquid 5. The drawing is purely an aid to understanding the invention.

As shown in the figure, a barrier layer 8, according to the invention, comprises an inner layer 2 and an outer layer 3. The inner layer 2 may be composed entirely of a non-polar, essentially water immiscible liquid, but is preferably composed of a mixture of (a) a non-polar, essentially water immiscible liquid and (b) a normally solid material, itself essentially water impermeable which is capable of being swollen by the non-polar liquid. As present in the barrier the normally solid material is in fact extensively swollen by the non-polar liquid preferably to the extent of assuming a gelatinous, viscous, semi-fluid form.

The outer layer 3 is composed of a solid film forming organic polymeric material having a high water impermeability but not extensively swellable by the non-polar liquid. The layer 3 may, of course, contain quantities of the liquid deposited within its pores.

The combined effect of layers 2 and 3 is to protect the core particle 1 from the solubilizing effect of the surrounding water 5 by preventing migration of the water through the capsule wall.

Materials suitable for the liquid component of layer 2 include hydrocarbons and halogenated hydrocarbons of low molecular weight, having not more than about 10 carbon atoms in the molecule. Such materials include hydrocarbons such as propane, isooctane, decane, and halogenated hydrocarbons having fluorine, chlorine, or bromine substituents such as trichlorofluoromethane and dichlorofluoromethane.

The solid component of the layer 2, where a solid component is present, may be a synthetic resin of the type described below for layer 3 or a resin capable of being swollen by the non-polar liquid. It may also comprise carrier material which is insoluble in water and soluble in the non-polar liquid, such as paraffin waxes, fats, oils, and greases.

The outer layer 3 may be formed of a wide variety of natural or synthetic film forming organic polymeric materials including polyolefins (polyethylene and polypropylene) vinyl resins such as polyvinyl chloride, polyvinylidene chloride, and polystyrene, acrylic resins such as polymethyl methacrylate, chlorinated polypropylene and chlorinated rubber.

In making capsules according to the invention, the water sensitive material is first encapsulated in layer 2 of the capsule (or a precursor of that layer) and then the outer layer 3. This may be done according to any known technique. Among these are phase-separation processes, which term encompasses aqueous phase separation processes, such as coacervation, as described for example in Pats. 2,800,457; 2,800,458; and 3,179,600; complex precipitation as described in Pat. 3,201,353, and energy induced protein coagulation as described in Pat. 3,137,631; organic phase separation processes as described in Pat. 3,155,590 and by Dobry et al. in J. Pol. Sci., January 1947, p. 90; wettable dispersion processes as described in Pat. 3,161,062; and spray drying processes as described in Pats. 3,202,731 and 3,016,308. Apart from the phase separation techniques, applicable encapsulation processes may include those based on reactions at an interface, which have been described in *International Science and Technology*, April 1965, pp. 66–76; Harvard Business School, "Report on Microencapsulation" (1963); *Microencapsulation by Interfacial Polymerization*, Soc. of Plastic Engineers Transactions *3*, 1963; *In situ Encapsulation with Polyethylene*, I&EC, August 1963, p. 11 and Pat. 3,219,476. Physical encapsulation methods of various types may also be used including fluid bed spray coating and electrostatic techniques. The former are described in Goldberger et al., *Battelle Technical Review*, November 1964, pp. 3–9 and Pats. 3,202,533 and 3,237,596. The latter is described in Pat. 3,028,951.

A preferred technique is to spray the wall material into a fluidized bed of the solids to be encapsulated. Thus, for example, the solid component or the precursor of the inner layer 2 may be applied to the core particles by spraying a melt or organic solution of the component into a fluidized bed of the solid particles, after which the particles may be coated with the outer layer 3 in similar manner.

Following formation of the inner layer 2 (solid component only or the solid precursor where the layer 2 is wholly liquid) and the outer layer 3 encapsulating the inner core 1, the capsule is subjected to treatment with the non-polar liquid. Specifically the capsules are covered with liquid and allowed to remain in contact with the liquid for some time. Pressure may be used and preferably is used but it is not strictly necessary. Usually the resident time will be a minimum of 24 hours. There is no maximum, since the capsules may remain in contact with the non-polar liquid indefinitely. The pressure may range from atmospheric to say 100 p.s.i.g. Generally, the pressure and time are selected having regard to constitution of the non-polar liquid and the capsule walls, so that the liquid penetrates the walls, displaces at least a part of the solid component of the inner wall 2 and swells the remainder of the solid component preferably to form a gelatinous semi-fluid material. Under such conditions the polar liquid will also occupy the voids and interstices of the outer layer 3. The result, in any case, is a capsule which is highly resistant to water penetration as will be demonstrated below.

It will be understood that the number of layers may be varied as desired. The swollen layer may be intermediate two non-swollen layers or there may be a multiplicity of swollen and non-swollen layers from the core to the outside of the capsule. It is only necessary that the outer layer be non-swollen.

The proportion of the non-polar fluid present in the swollen layer will vary depending on the materials but it will in general be from about 5 to about 90%, by weight of the swollen layer.

The non-polar liquid has been referred to as a liquid and it will be in the liquid phase as introduced into the capsule. However, in cases where it is desired to have the capsules spontaneously burst as, for example, upon being sprayed from a pressurized container into the atmosphere, the non-polar liquid may be selected from substances which are gaseous at standard conditions, and introduced into the capsule under conditions under which it is in the liquid phase.

The invention will be further described with reference to the following specific examples which are given for purposes of illustration only.

In the Examples, the core material was potassium persulfate. The inner material was a mixture of paraffin wax (m.p. 152°–155° F.) and a wax compatible terpolymer (Elvax 4260 sold by E. I. du Pont de Nemours & Company). The weight ratio of the wax to the Elvax was 4.6 to 1.0. The outer layer was chlorinated rubber (Parlon P-20 or S5-10 made by Hercules, Inc.) or a vinylidene chloride/acrylonitrile compolymer (Saran F220, manufactured by Dow Chemical Company).

Elvax 4260 is made under U.S. Pat. No. 3,215,678 of at least 65 percent by weight ethylene, 27 to 20 percent by weight vinyl acetate, and acrylic and/or methacrylic acid in an amount providing the Elvax 4260 terpolymer of acid number of 4 to 8 (milligrams KOH/g. terpolymer) and of melt index of 5 to 7 (grams/10 min., ASTM D 1238, modified). Parlon P-20 or S5-10 is natural rubber chlorinated to a 67 percent by weight chlorine content and has a viscosity of between 17 and 25 centipoises (20 percent/weight in toluene, 25° C.). Saran F220 is a copolymer of at least 73 percent vinylidene chloride and acrylonitrile in an amount providing the copolymer with a specific gravity of 1.60 and with complete solubility in acetone with a 20 percent solution in acetone at 25° C. having a viscosity of approximately 60 centipoises.

Encapsulation was accomplished by melting the Elvax-wax mixture (170–190° F.) and spraying it into a fluidized bed of potassium persulfate particles having an average diameter of 210–240μ. The bed was fluidized with air and maintained at 70–90° F.

Using a similar technique the outer coatings were applied by dissolving the chlorinated rubber or the vinylidene chloride/acrylonitrile copolymer in a suitable solvent and spraying the previously encapsulated material in a fluidized bed.

EXAMPLE 1

Potassium persulfate core particles in the 210–240 micron (μ) size range were coated with a molten terpolymer-paraffin layer. A second coating of chlorinated rubber (Parlon P20) was applied from a 20% solution in a 1:1 mixture of toluene and cyclohexane. The final capsules were, on the average, composed of an outer coating of 9.0 wt. percent chlorinated rubber, an interlayer of 34.3 wt. percent terpolymer-paraffin, and a core of 56.7 wt. percent potassium persulfate. When this product was placed into water, 36.5 wt. percent of the potassium persulfate core was leached from the core after only 100 hours. However, when the same product was immersed in a mixture of 67% dichlorodifluoromethane and 33% dichlorotetrafluoroethane for one week and then removed and placed into water, only 5 wt. percent of the core was leached after 850 hours. The same product, when immersed in trichlorotrifluoroethane for one week and then placed into water, lost only 14 wt. percent of its core after 100 hours.

EXAMPLE 2

A product was made using the fluidized technique described above by first coating potassium persulfate particles with a 1:9 molten mixture of the wax-compatible terpolymer (Elvax) and paraffin wax, then with a layer of vinylidene chloride/acrylonitrile copolymer (Saran 220) from a 10% solution in a 1:1 mixture of dichloromethane and acetone and finally with chlorinated rubber from a 20% solution in a 1:1 mixture of toluene and cyclohexane. The completed capsules were composed of 51.6% by weight persulfate, 21.7% inner layer (terpolymer-paraffin), 13.6% vinylidene chloride/acrylonitrile copolymer intermediate layer, and 13.1% chlorinated rubber outer layer. When this product was immersed in water, 14 percent of the core solute was found to be leached out after 100 hours. The same product, after immersion in a 2:1 mixture of dichlorodifluoromethane and dichlorotetrafluoroethane for one week followed by immersion in water, gave the following leach results: after 100 hours, 0.8 wt. percent leached; after 1000 hours, 6.5 wt. percent leached.

EXAMPLE 3

A product was prepared using the technique described having the following composition: core, 65.7% by weight potassium persulfate; inner layer, 23.4% by weight terpolymer (Elvax)-paraffin (1:9), outer layer (outermost coating)—10.9% by weight chlorinated rubber (Parlon S5-10), the latter being applied from a 20% solution in a 1:1 mixture of dichloromethane and toluene. Immersion of this product in water resulted in 19 wt. percent of the core solute leaching after only 10 hours. Immersion of the same product in a 1:1 mixture of dichlorodifluoromethane and dichlorotetrafluoroethane for one week, followed by immersion in water yielded only 0.5 wt. percent after 200 hours.

A portion of the product capsule described above, prior to fluorocarbon treatment was further treated by applying a thin outer coating of Elvax 4260. The Elvax terpolymer was applied using the fluidized bed technique described, from a 5% solution in a mixture of cyclohexane and petroleum ether. The net result was a product having a 61.6 percent potassium persulfate core, 19.8 wt. percent terpolymer-paraffin (1:9) inner layer, 12.3 wt. percent chlorinated rubber intermediate layer polymer and 6.3 wt. percent terpolymer outer coating. When this modified product was immersed in the fluorocarbon mixture identified above, for one week and then leached in water, the solute retention increased to 0.6 wt. percent loss of solute by leaching after 200 hours (vs. 7.0 percent before) and 3.0 wt. percent loss after 1000 hours.

EXAMPLE 4

A product was prepared using the technique described above comprising a 58.0 wt. percent potassium persulfate core, a 25.0% by weight wax-compatible terpolymer (Elvax)—paraffin inner layer and a 17.0% by weight chlorinated rubber (Parlon S5-10) outer coating. Immersion in water resulted in a 55 weight percent loss of the core solute after only 10 hours. Immersion in the fluorocarbon mixture of Example 3 for one week yielded a 17.0 weight percent loss of core solute after 100 hours.

A portion of this product prior to fluorocarbon treatment was treated with dimethyl dichlorosilane using a fluidized bed technique. Approximately 14 parts by weight of silane were added per 100 parts of original product to give a new polymer outer coating. Immersion of this modified product in water yielded 2.5 weight percent loss of solute in 10 hours and 33.0 weight percent after 100 hours. Immersion in the fluorocarbon mixture of Example 3 for one week, followed by water leaching resulted in a most improved leach rate of 6.9 weight percent solute loss after 1100 hours.

What is claimed is:

1. A microcapsule resistant to penetration by water and other polar liquids which comprises a solid, water sensitive core and a wall, said wall comprising a first layer of a hydrocarbon or halogenated hydrocarbon liquid and a second layer of a film-forming water-insoluble polymeric organic material insoluble in and substantially non-swellable by but permeable to hydrocarbon and halogenated hydrocarbon solvents.

2. The capsule of Claim 1 wherein said hydrocarbon or halogenated hydrocarbon liquid consists essentially of a completely halogenated derivative of methane, ethane, or combinations thereof.

3. The capsule of Claim 2, wherein said hydrocarbon or halogenated hydrocarbon liquid consists essentially of a fluorocarbon.

4. The microcapsule claimed in Claim 1 wherein said film-forming material is a vinyl resin, a polyolefin, a halogenated polyolefin or chlorinated rubber.

5. The microcapsule claimed in Claim 1 wherein said first layer includes a terpolymer of ethylene, vinyl acetate and acrylic or methacrylic acid.

6. A microcapsule resistant to penetration by water and other polar liquids which comprises a solid, water-sensitive core and a wall, said wall comprising a first layer comprising a waxy or fatty carrier material insoluble in water but soluble in hydrocarbon or halogenated hydrocarbon liquids and a non-polar hydrocarbon or halogenated hydrocarbon liquid solvent for said carrier; and a second layer of a film-forming water-insoluble polymeric organic material insoluble in and substantially non-swellable by but permeable to hydrocarbon and halogenated hydrocarbon solvents.

7. The microcapsule claimed in Claim 6 and wherein said first layer includes a terpolymer of ethylene, vinyl acetate and acrylic or methacrylic acid.

8. A method of making microcapsules which are resistant to penetration by water and other polar liquids which comprises (a) encapsulating a solid, water sensitive reactant with (i) a first layer comprising a waxy or fatty carrier material insoluble in water but soluble in hydrocarbon or halogenated hydrocarbon liquids; and (ii) a second layer of a film-forming water-insoluble polymeric organic material insoluble in and substantially non-swellable by but permeable to hydrocarbon or halogenated hydrocarbon liquids, and (b) treating the resulting microcapsules with a non-polar hydrocarbon or halogenated hydrocarbon liquid solvent for said carrier material to dissolve and displace at least a portion of said first layer.

9. The method claimed in Claim 8 and wherein said first layer includes a terpolymer of ethylene, vinyl acetate and acrylic or methacrylic acid.

10. The method of Claim 8 wherein said non-polar liquid solvent consists of hydrocarbon.

11. The method claimed in Claim 8 wherein said non-polar liquid solvent is a halogenated hydrocarbon.

12. The method of Claim 11 wherein said halogenated hydrocarbon is a chlorinated or fluorinated derivative of methane, ethane, or combinations thereof.

13. The method of Claim 11 wherein said halogenated hydrocarbon liquid consists essentially of a fluorocarbon.

14. The method claimed in Claim 8 wherein the carrier material is a wax.

15. The method claimed in Claim 8 wherein the second layer is selected from the group consisting of vinyl resins, polyolefins, halogenated polyolefins, and chlorinated rubber.

References Cited
UNITED STATES PATENTS

| | | | |
|---|---|---|---|
| 3,460,972 | 8/1969 | Nack | 252—316 X |
| 3,317,433 | 5/1967 | Eichel | 252—316 |
| 2,969,331 | 1/1961 | Brynko et al. | 252—316 |
| 3,516,943 | 6/1970 | Brynko et al. | 252—316 |
| 3,016,308 | 1/1962 | Macaulay | 252—316 X |
| 3,215,678 | 11/1965 | Adelman | 260—80.8 |
| 3,256,153 | 6/1966 | Heimlich | 424—33 X |
| 3,679,102 | 7/1972 | Charle et al. | 252—316 X |

RICHARD D. LOVERING, Primary Examiner

U.S. Cl. X.R.

117—72, 92, 100 B, Dig. 6; 252—70, 90, 188.3 R; 424—73